Oct. 31, 1961     W. J. OPOCENSKY     3,006,671

INTERNAL STAKING

Filed Aug. 3, 1959

*INVENTOR.*
WILLARD J. OPOCENSKY
BY
ATTORNEY

United States Patent Office 3,006,671
Patented Oct. 31, 1961

3,006,671
INTERNAL STAKING
Willard J. Opocensky, Glendale, Calif., assignor to General Precision, Inc., a corporation of Delaware
Filed Aug. 3, 1959, Ser. No. 831,132
4 Claims. (Cl. 287—54)

This invention relates to a new and improved internal clamp for shafts and the like, and more particularly to a new and improved internal clamp for precisely maintaining the position of a shaft or the like during the adjustment thereof and setting of the clamp and subsequent use thereof.

The use of set screws for clamping shafts in a fixed position presents problems when a precise position is required, as the final clamping action of a set screw will at times cause a slight shifting of such shafts.

Another disadvantage of using a set screw to hold a shaft in a clamped position is that under severe vibration the clamped shaft will shake loose and shift its position, also set screws permanently mar or disfigure shaft.

The object of this invention is the provision of a clamping means, whereby a shaft may be clamped in a precise position and maintain such position for an indefinite period of time under severe conditions.

Other objects and advantages of this invention will become apparent as the description proceeds, and when considered in conjunction with the accompanying claims and drawing, in which:

Figure 1:
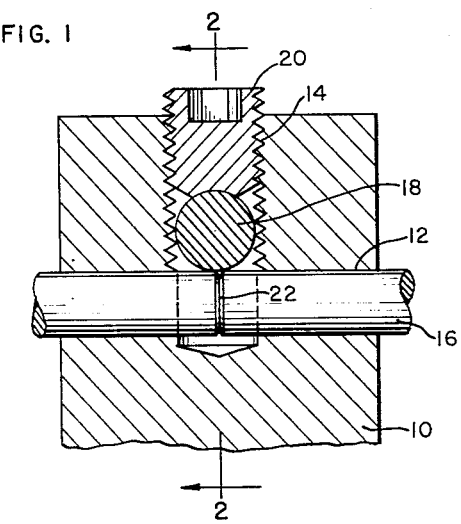
FIGURE 1 shows a sectional view of clamping device embodying this invention with the parts shown prior to the clamped position.

FIGURE 1 illustrates one preferred form of this invention having a body or shaft mounting member 10, which is provided with a hole 12 adapted to receive a shaft 16 and an intercepting threaded hole 14, which is preferably of a slightly larger diameter than hole 12. Aperture 14 is adapted to receive a relatively soft ductile slug which may be a metal ball 18 formed of aluminum, or other similar metallic or non-metallic material and a threaded element such as set screw 20, with the metal ball 18 positioned adjacent the shaft 16. The shaft 16 is provided wtih a deformed portion illustrated here as an annular groove 22, which is longitudinally positioned within the confines of a threaded aperture 14, as shown in FIGURE 1.

Figure 2:
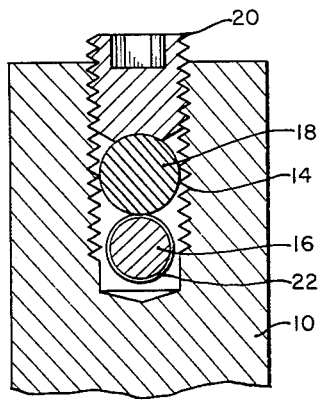
FIGURE 2 shows a section taken on the line 2—2 of FIGURE 1.
Figure 3:
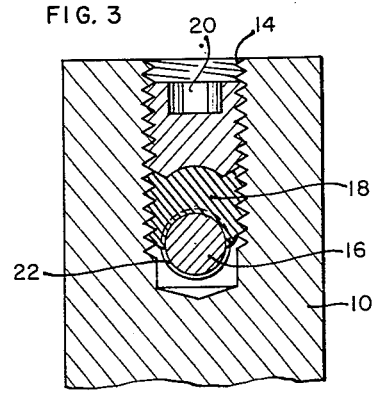
FIGURE 3 shows a sectional view similar to FIGURE 2 with the parts shown in a clamped position.

With the elements of this invention assembled in a position, as illustrated in FIGURE 2, rotational force is applied to the set screw 20 forcing the soft metal ball to cold flow into intimate engagement with the threads of hole 14, and also around and into intimate contact with shaft 16 and the annular groove 22. This effectively locks the shaft 12 in a permanent position in the body member 10 and effectively prevents both rotation and axial movement, as illustrated in FIGURE 3. During the clamping action, relative movement of the shaft is avoided by virtue of the fact that the soft metal ball being positioned between the set screw and shaft, will prevent transmission of the rotational movement of the set screw into the shaft.

From the foregoing, it will be seen that the metal ball 18 actually cold flows into the threads of hole 14, around shaft 16 into the space provided by virtue of threaded hole 14 being larger than shaft 16 and into groove 22. Thus, the cold flowed metal of ball 18 flowing around shaft 16 and into groove 22 securely and permanently clamps shaft 16 into block 10. As illustrated in FIGURE 3, the metal ball 18 is caused to flow around approximately one half of shaft 16, but it is to be understood that the extent to which this takes place is dependent upon the amount of pressure applied by screw 20.

Figure 4:
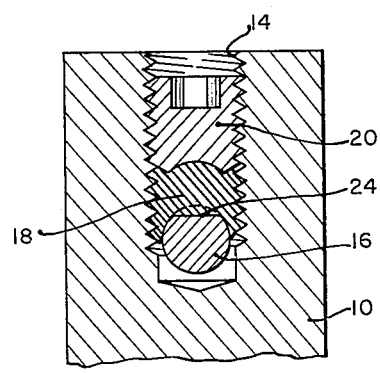
FIGURE 4 shows a sectional view similar to FIGURE 3 of a modified form of a clamping device in a clamped position.

FIGURE 4 illustrates a modified form of this invention, wherein the shaft 16 is provided with a deformed portion, such as a notch 24. The remainder of the clamping device may be substantially the same as that shown in FIGURES 1–3, with like parts identified with like reference numerals. The advantage of a notch is that it will resist greater torsional strain of the shaft 16, also it would enable to position the shaft in a particular radial position.

Figure 5:
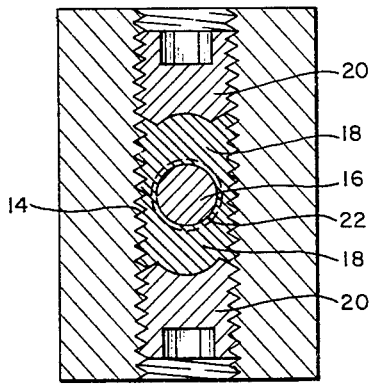
FIGURE 5 shows a sectional view of a clamping device embodying this invention, employing a double locking means.

FIGURE 5 illustrates a second modified form of this invention, wherein a pair of set screws 20 are diametrically opposed to the shaft 16, with a pair of relatively soft ductile slugs 18 positioned between the shaft 16 and the set screws 20. By applying rotational forced to the set screws 20, the soft metal slugs are forced to cold flow into intimate engagement with the threads of taped holes 14, the shaft 16, and the annular groove 22 in shaft 16. This metal from slugs 18 is also forced into intimate engagement with each other, and completely surrounds shaft 16, giving a more positive grip.

It will also be seen from the foregoing, that while this clamp gives a positive radial and axial locking, it is possible to drive the shaft 16 out of the block 10 without destroying or mutilating either the shaft or the block. The soft metal 18 can then be tapped out of the hole 14 and both the shaft 16 and the block 10 be reused.

Although one preferred form and two modified forms of this invention have been illustrated and described herein, it will become apparent that it may be modified further in various ways, such as the omission of the set screw and forcing the soft metal, or plastic slug or ball, into the threads and annular shaft groove with a suitable tool, and then removing such tool, allowing the deformed ball to clamp the body and shaft together. The shaft may also be provided with a plurality of annular grooves or notches, so that it may be clamped in a greater range of positions.

What is claimed is:
1. A clamping assembly for use with shafts, and the like, including: a body member having a first hole therein for receiving a shaft and having a second hole therein of larger diameter than said first hole transversing and intercepting said first hole and extending across said first hole to form a space surrounding the periphey of said first hole and thereby surrounding at least a portion of the shaft received in said first hole along a portion of the axial length of said shaft, at least one relatively soft member capable of being cold flowed and adapted to be positioned in the second hole in said body member, and relatively hard means for engaging said relatively soft member to cause the same to be cold flowed from the second hole in said body member into the space surrounding the shaft received in said first hole and into intimate engagement with the peripheral surface of said portion of the axial length of such shaft to positively lock the shaft in said body member and prevent axial and rotational movement thereof.

2. A clamping assembly for use with a shaft having an annular groove formed therearound, said assembly including: a body member having a first hole therein for receiving the shaft and having a second threaded hole therein of greater diameter than said first hole and extending radially with respect to the first hole to traverse and intercept the same and to extend across the first hole so as to form a space surrounding the first hole and thereby surrounding the shaft received in the first hole, the shaft being so received that an annular groove therein is surrounded by said space, a first member composed of relatively soft material capable of being cold flowed, said first member being positioned in the second hole in said body member in engagement with the annular groove of the shaft received in the first hole, and a threaded second member composed of relatively hard material, said second member being threaded into the second hole in engagement with the first member so as to cause the first member to be cold flowed into the threads of the second hole and from the second hole into the space surrounding the first hole and into intimate engagement with the shaft and the annular groove therein and around the surface of the shaft in a circumferential direction to positively lock the shaft in said body member and prevent axial and rotational movement thereof.

3. A clamping assembly for use with a shaft having a relatively narrow annular groove therearound, said assembly including: a body member having a first hole therein for receiving the shaft and having a threaded second hole therein of greater diameter than the first hole and extending radially with respect to the first hole to traverse and intercept the same and to extend across said first hole so as to form a space surrounding the first hole and thereby surrounding the shaft received in the first hole, the shaft being so positioned in the first hole that said annular groove is in alignment with the second hole, a first member composed of relatively soft material capable of being cold flowed, said first member being positioned in the second hole in said body member in engagement with the groove around said shaft received in the first hole, and a threaded second member composed of relatively hard material, said second member being threaded into the second hole into engagement with the first member so as to cause the same to be cold flowed into the threads of the second hole in said body member and from the second hole into the space surrounding the first hole and into intimate engagement with the shaft and the groove formed therearound and around the surface of the shaft in a circumferential direction to positively lock the shaft in said body member and prevent axial and rotational movement thereof.

4. A clamping assembly for use with shafts, and the like, including: a body member having a first hole extending therethrough for receiving a shaft having a relatively narrow annular groove therearound and having a threaded second hole extending therethrough of larger diameter than said first hole traversing and intercepting said first hole so as to form a space surrounding said first hole and thereby completely surrounding the shaft received in the first hole along a portion of the axial length of said shaft, first and second members composed of relatively soft material capable of being cold flowed, said first and second members being positioned in said second hole in said body member on opposite sides of the shaft received in said first hole, threaded third and fourth members composed of relatively hard material, said third and fourth members being threaded into said second hole into respective engagement with the first and second members so as to cause the first and second members to be cold flowed into the threads of the second hole in said body member and from the second hole into the space surrounding the first hole so as to surround the shaft and into said groove received in the first hole in intimate engagement therewith to positively lock the shaft in said body member and prevent axial and rotational movement thereof.

References Cited in the file of this patent

UNITED STATES PATENTS

| | | |
|---|---|---|
| 628,060 | Zorn | July 4, 1899 |
| 1,849,100 | Little | Mar. 15, 1932 |
| 2,007,703 | Bertschi | July 9, 1935 |
| 2,355,943 | Beede et al. | Aug. 15, 1944 |